R. E. GILMAN.
DYNAMO ELECTRIC MACHINE.
APPLICATION FILED OCT. 3, 1914.
1,262,774.
Patented Apr. 16, 1918.
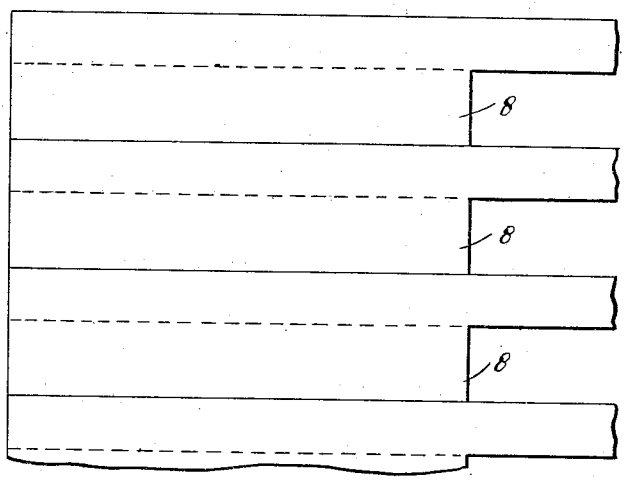
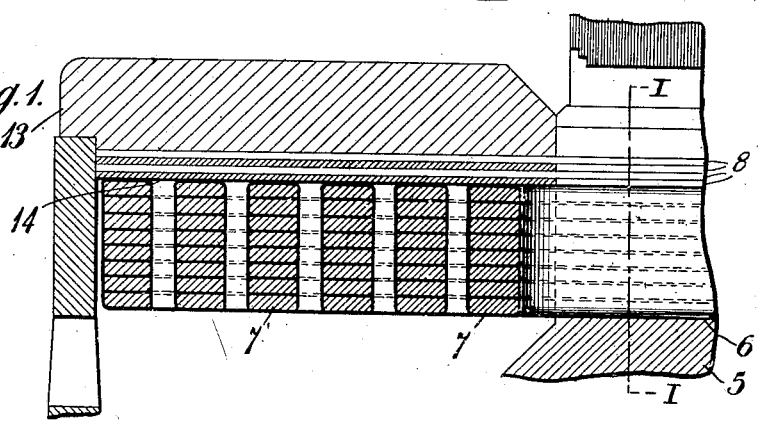
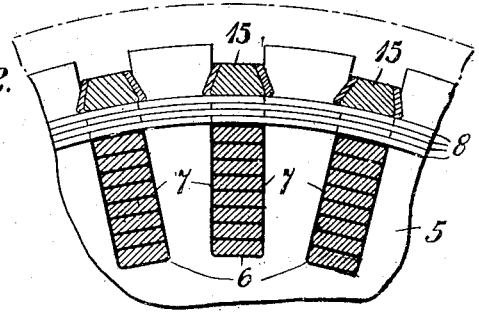
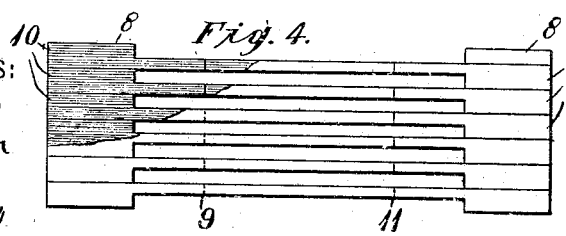
WITNESSES:
Fred H Miller
D. C. Davis
INVENTOR
Ralph E. Gilman
BY
Wesley G. Carr
ATTORNEY

UNITED STATES PATENT OFFICE.

RALPH E. GILMAN, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,262,774.  Specification of Letters Patent.  Patented Apr. 16, 1918.

Application filed October 3, 1914. Serial No. 864,703.

*To all whom it may concern:*

Be it known that I, RALPH E. GILMAN, a citizen of the United States, and a resident of Pittsburgh, in the county of Allegheny and State of Pennsylvania, have invented a new and useful Improvement in Dynamo-Electric Machines, of which the following is a specification.

My invention relates to damper windings for dynamo-electric machines, and it has for its object to provide a winding of the character specified that may be cheaply and easily constructed and which will be effective in operation.

In the manufacture of various types of alternating-current machinery, it is frequently necessary that a short circuited winding of the squirrel-cage type or of the grid type be provided in order that the currents induced therein may exercise a beneficial action in the operation of the machine. Familiar examples of this are the damper windings employed with synchronous motors and rotary converters in order to render such machines self-starting and in order to prevent "hunting" when in operation. Furthermore, it is frequently found necessary to provide the rotating fields of single-phase alternating current generators, especially of the turbine type, with a cage or damper winding to prevent overheating of the poles by reason of the pulsating armature reaction. By my invention, I am enabled to provide windings of the character described, in a simple and effective manner.

Referring to the accompanying drawing, Figure 1 is a partial sectional view of a rotating field of an alternating current generator of the turbine type taken on a radial plane; Fig. 2 is a partial sectional view of the structure shown in Fig. 1 taken on a plane indicated by the line I—I; Fig. 3 is a fragmentary plan view of a portion of the conducting elements shown in Fig. 1, and Fig. 4 is a plan view, partially broken away, showing the arrangement of some of the conducting elements of a complete winding constructed in accordance with my invention.

The core member 5 of a dynamo-electric machine is provided with a plurality of slots 6 in which are placed suitable windings 7, in this instance, field coils. A plurality of L-shaped conducting members 8, constructed preferably of copper, are superposed upon the field coils 7 in such a manner as to build up a winding of the squirrel-cage type. The stems of the conducting members 8 are of two different lengths, as clearly shown in Fig. 4, the sum of the lengths of a long and a short stem being equal to the length of the slot 6. In assembling the winding, an L-shaped conducting member 8, having a long stem, is inserted in one end of each slot and an L-shaped conducting member, having a short stem, is inserted in the other end of each slot so that the free ends of the stems make contact with each other within the slot, as for example at the point 9 in Fig. 4. The feet of the L-shaped conducting members inserted at each end of the core member are turned in the same direction, as shown at 10 in Fig. 4, forming a substantially continuous end ring for the winding. A second layer of L-shaped conducting members is next superposed upon the first layer, and the long and short stems are inserted from the opposite ends, as compared with those constituting the first layer. In this manner, the junction points 11 of the stems within the slots are staggered with respect to the junction points 9, so that there is an overlapping of the long stems within the slot and, consequently, a large area of electrical contact exists between the conducting members of the two layers. Furthermore, at each end of the core member, the feet of the L-shaped conducting members are turned in the opposite direction from the feet of the underlying layers, as shown at 12 in Fig. 4. In this manner, the joints between the conducting members, in each of the end rings, are staggered with respect to each other, and intimate electrical contact is obtained between the various conducting members.

The above described operation may be continued until any desired number of layers of the L-shaped conducting members 8 have been assembled, such, for example, as four, shown in Figs. 1 and 2. Suitable wedges 15 of the usual type are then inserted in the slots 6 to maintain the winding firmly in place therein, the component parts of the end rings are sweated or spot welded together, and clamping rings 13 having a slight internal taper are forced upon the ends of the rotor 8 to enable the ends of the coils 7 and the end rings of the squirrel-cage winding to resist the action of centrifugal force. The entire squirrel-cage winding may be insulated from the core by paper or other suitable material in order to prevent short circuiting thereof by the core, although this is generally not necessary. It is necessary, however, that the winding be well insulated from the coils 7, especially when there is a great difference of potential between points in the coils, and I therefore insert a sheet 14 of suitable insulating material beneath the members 8.

While I have referred to the different L-shaped members as abutting against each other, it is not absolutely necessary that they be in actual contact, because sufficient electrical conductivity is provided by the overlapping of the members, both in the active conductors and in the end rings.

I have described my damper winding as applied to the outer cylindrical surface of a rotor member but it is obvious that it may be applied to the inner cylindrical surface of a stator without radical modifications. Furthermore, it is not necessary that a complete squirrel cage be constructed but, if desired, separate damping windings for each pole may be formed by the method set forth.

Various modifications will be obvious to those skilled in the art and I desire that only such restrictions shall be imposed as are set forth in the accompanying claims.

I claim as my invention:

1. In a dynamo-electric machine, the combination with a core member provided with a plurality of slots, of a plurality of substantially plane conducting members, one of said conducting members lying partially in each of said slots, respectively, said conducting members being provided with transversely extending members outside of said slots, each of which abuts against the conducting member associated with an adjacent slot.

2. In a dynamo-electric machine, the combination with a core member provided with a plurality of slots, of a plurality of pairs of substantially plane L-shaped conducting members, one of which pairs is associated with each of said slots, the stems of the two conducting members associated with each slot lying in said slot and abutting against each other and the feet of the two conducting members extending transversely at the two ends of the slot and abutting against the conducting members in an adjacent slot.

3. In a dynamo-electric machine, the combination with a core member provided with a plurality of slots, of two pairs of substantially flat L-shaped conducting members associated with each of said slots, each pair comprising a member with a relatively long stem and a member with a relatively short stem, the stems of the two conducting members of a pair lying in a slot with their ends adjacent and with their feet extending transversely at the two ends of the slot and terminating in proximity to the conducting members in one immediately adjacent slot, the stems of the two conducting members of the other pair associated with the said slot lying in said slot upon the stems of said first mentioned pair and having their ends adjacent to each other and forming a joint which is staggered with respect to the joint between the ends of the first mentioned pair, the feet of the last named pair of conducting members extending transversely at the two ends of the slot and terminating adjacent the conducting members in the other immediately adjacent slot.

4. In a dynamo-electric machine, the combination with a core member provided with a plurality of slots, of two pairs of substantially plane L-shaped conducting members associated with each of said slots, each pair comprising a member with a relatively long stem and a member with a relatively short stem, the stems of the two conducting members of a pair lying in a slot with their ends adjacent and with their feet extending transversely at the two ends of the slot and terminating in proximity to the conducting members in an adjacent slot, the stems of the two conducting members of the other pair associated with the said slot lying in said slot upon the stems of said first mentioned pair and having their ends adjacent to each other and forming a joint which is staggered with respect to the joint between the ends of the first mentioned pair, the feet of the last named pair of conducting members extending transversely at the two ends of the slot and terminating in proximity to the conducting members in an adjacent slot, each foot extending in an opposite direction from the foot of the underlying L-shaped member corresponding thereto, whereby the joints between the conducting members at the ends of the slots are staggered with respect to each other.

5. In a dynamo-electric machine, the combination with a core member provided with a cylindrical surface and with a plurality of slots elemental with respect to said surface and extending radially into the body of said core member, of a plurality of substantially flat L-shaped conducting members, one of which is associated with each of said slots at one end of the core member, having its stem inserted into the slot and having its foot extending transversely of the slot and terminating in proximity to the conducting member in an adjacent slot, a plurality of L-shaped conducting members, one of which is associated with each of said slots at the other end of the core member, having its stem inserted into the slot to make contact with the first mentioned L-shaped conductor lying in the slot and having its foot extending transversely of the slot and engaging with the conducting member associated with an adjacent slot.

6. A squirrel-cage winding comprising a plurality of substantially plane L-shaped conducting members, the active conductors being formed from the stems of said conducting members and the end rings being formed from the feet of said conducting members.

7. A squirrel-cage winding comprising a plurality of substantially plane L-shaped conducting members arranged in a plurality of layers, the active conductors of the winding being composed of the stems of said conducting member and the end rings being composed of the feet of said conducting members, the joints between the conducting members in each layer being staggered with respect to the joints in the immediately adjacent layers.

8. A squirrel-cage winding comprising a plurality of substantially plane L-shaped conducting members arranged in a plurality of layers, each of the active conductors of said winding being made up of a plurality of conducting elements, each of which comprises the stems of two of said L-shaped conducting members terminating in proximity to each other at their free ends and having their feet extending transversely at each end of said windings into proximity to adjacent conducting members to form the end rings of said winding.

9. A squirrel-cage winding comprising a plurality of substantially plane L-shaped conducting members arranged in a plurality of layers, each of the active conductors of said winding being made up of a plurality of conducting elements, each of which comprises the stems of two of said L-shaped conducting members terminating adjacent each other at their free ends, the joints between the stems of the various elements of each active conductor being staggered with respect to the immediately adjacent elements and having their feet extending transversely at each end of said winding into proximity to adjacent conducting members to form the end rings of said winding.

10. A squirrel-cage winding comprising a plurality of substantially plane L-shaped conducting members arranged in a plurality of layers, each of the active conductors of said winding being made up of a plurality of conducting elements, each of which comprises the stems of two of said L-shaped conducting members in proximity to each other at their free ends and having their feet extending transversely at each end of said windings into proximity to adjacent conducting members to form the end rings of said winding, the feet of the conducting members of each layer at each end of said winding extending in the opposite direction from the feet in the immediately adjacent layers at that end, whereby the joints between the various conducting members in each end ring are disposed in staggered relation to each other.

11. A squirrel-cage winding comprising a plurality of substantially plane L-shaped conducting members arranged in a plurality of layers, each of the active conductors of said winding being made up of a plurality of conducting elements, each of which comprises the stems of two of said L-shaped conducting members in proximity to each other at their free ends, the joints between the stems of the various elements of each active conductor being staggered with respect to the immediately adjacent elements and having their feet extending transversely at each end of said winding into proximity to adjacent conducting members to form the end rings of said winding, the feet of the conducting members of each layer at each end of said winding extending in the opposite direction from the feet in the immediately adjacent layers at that end, whereby the joints between the various conducting members in each end ring are disposed in a staggered relation to each other.

12. A squirrel-cage winding comprising a plurality of substantially plane L-shaped conducting members arranged in a plurality of layers, each of the active conductors of said winding being made up of a plurality of conducting elements, each of which comprises the stems of two of said L-shaped conducting members in proximity to each other at their free ends, the joints between the stems of the various elements of each active conductor being staggered with respect to the immediately adjacent elements, and having their feet extending transversely at each end of said winding into proximity to adjacent conducting members to form the end rings of said winding, each of said L-shaped conducting members being soldered to the immediately adjacent conducting members.

In testimony whereof, I have hereunto subscribed my name this 26th day of Sept., 1914.

R. E. GILMAN.

Witnesses:
B. B. HINES,
I. L. GRIFFITH.